United States Patent
Chen et al.

(10) Patent No.: US 10,270,711 B2
(45) Date of Patent: Apr. 23, 2019

(54) EFFICIENT CLOUD SERVICE CAPACITY SCALING

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 172 days.

(21) Appl. No.: 15/460,411

(22) Filed: Mar. 16, 2017

(65) Prior Publication Data

US 2018/0270165 A1 Sep. 20, 2018

(51) Int. Cl.
G06F 9/46 (2006.01)
H04L 12/911 (2013.01)
G06F 9/48 (2006.01)
G06F 9/50 (2006.01)

(52) U.S. Cl.
CPC .......... *H04L 47/822* (2013.01); *G06F 9/4881* (2013.01); *G06F 9/5077* (2013.01); *G06F 9/5083* (2013.01)

(58) Field of Classification Search
CPC .................................................. G06F 9/4881
USPC ......................................................... 718/103
See application file for complete search history.

(56) References Cited

U.S. PATENT DOCUMENTS 9,225,614 B2 * 12/2015 Koley ................. H04L 41/5022
9,331,943 B2 * 5/2016 Yeddanapudi .......... H04L 47/11
9,489,647 B2 * 11/2016 Martinez ................ G06Q 10/06
2013/0346227 A1 * 12/2013 Jain ........................ G06Q 30/08
 705/26.3
2014/0229608 A1 * 8/2014 Bauer ................... H04L 41/142
 709/224
2016/0246652 A1 * 8/2016 Herdrich ............... G06F 9/5077
2016/0328265 A1 * 11/2016 Xu .......................... H04L 12/28
(Continued)

FOREIGN PATENT DOCUMENTS

WO 2014/073949 A1 5/2014

OTHER PUBLICATIONS

Malik et al., Latency Based Dynamic Grouping Aware Cloud Scheduling, 2012 26th International Conference on Advanced Information Networking and Applications Workshops, Mar. 26-29, 2012, pp. 1190-1195.
(Continued)

*Primary Examiner* — Mehran Kamran
(74) *Attorney, Agent, or Firm* — K&L Gates LLP

(57) ABSTRACT

Efficient cloud service capacity scaling is disclosed. For example, a plurality of services are configured to execute on a plurality of isolated guests, each service being in a real-time latency tolerance or a retriable latency tolerance. A first service in the real-time latency tolerance is added to a scheduling queue while second and third services in the retriable latency tolerance and execute in the plurality of isolated guests. A scheduler determines that a current computing capacity of the plurality of isolated guests is below a minimum capacity threshold. The scheduler determines whether to elevate the second and/or the third service to the real-time latency tolerance. The scheduler determines to, and then elevates the second service to the real-time latency tolerance. The scheduler determines not to elevate the third service, which is then terminated, freeing computing capacity. The first service is then executed in the plurality of isolated guests.

18 Claims, 8 Drawing Sheets

(56) References Cited

U.S. PATENT DOCUMENTS

| | | | |
|---|---|---|---|
| 2017/0024234 A1* | 1/2017 | Wu | G06F 9/45558 |
| 2017/0161117 A1* | 6/2017 | Fukuda | G06F 9/5077 |
| 2018/0032399 A1* | 2/2018 | Johnson | G06F 11/142 |
| 2018/0285294 A1* | 10/2018 | Chagam Reddy | G06F 13/30 |

OTHER PUBLICATIONS

Malik et al., Latency based group discovery algorithm for network aware cloud scheduling, Future Generation Computer Systems, vol. 31, Feb. 2014, pp. 28-39.

Murthy et al., Big Data Working Group: Big Data Taxonomy, Sep. 2014 (33 pages).

* cited by examiner

EFFICIENT CLOUD SERVICE CAPACITY SCALING

BACKGROUND

The present disclosure generally relates to deploying computing services in a network environment. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Services for performing specific computing tasks may then be deployed on one or more isolated guests as necessary based on the computing requirements of the intended tasks. Isolated guests allow a programmer to quickly scale the deployment of applications including services to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. After maximizing isolated guest density on a given physical hardware configuration, utilization rates of each isolated guest may also be optimized. A scheduler may be implemented to allocate services to a hosts which may be either physical hosts or a virtual hosts such as virtual machines.

SUMMARY

The present disclosure provides a new and innovative system, methods and apparatus for efficient cloud service capacity scaling. In an example, a first service of a plurality of services, in a real-time latency tolerance is added to a scheduling queue, where each service is configured to execute on at least one isolated guest of a plurality of isolated guests, and each service is in either the real-time latency tolerance or a retriable latency tolerance. At least a second service and a third service are in the retriable latency tolerance and executing in the plurality of isolated guests. A scheduler determines that a current computing capacity of the plurality of isolated guests is below a minimum capacity threshold to execute the first service. A quantity of isolated guests in the plurality of isolated guests flexibly scales based on computing resource demands. The scheduler determines whether to elevate the second service and/or the third service to the real-time latency tolerance. In response to determining to elevate the second service to the real-time latency tolerance, the second service is elevated to the real-time latency tolerance. In response to determining not to elevate the third service to the real-time latency tolerance, the third service is terminated on a first isolated guest of the plurality of isolated guests, freeing computing capacity. The first service is then executed in the plurality of isolated guests including on the first isolated guest.

Additional features and advantages of the disclosed method and apparatus are described in, and will be apparent from, the following Detailed Description and the Figures.

DETAILED DESCRIPTION OF EXAMPLE EMBODIMENTS

Figure 1:
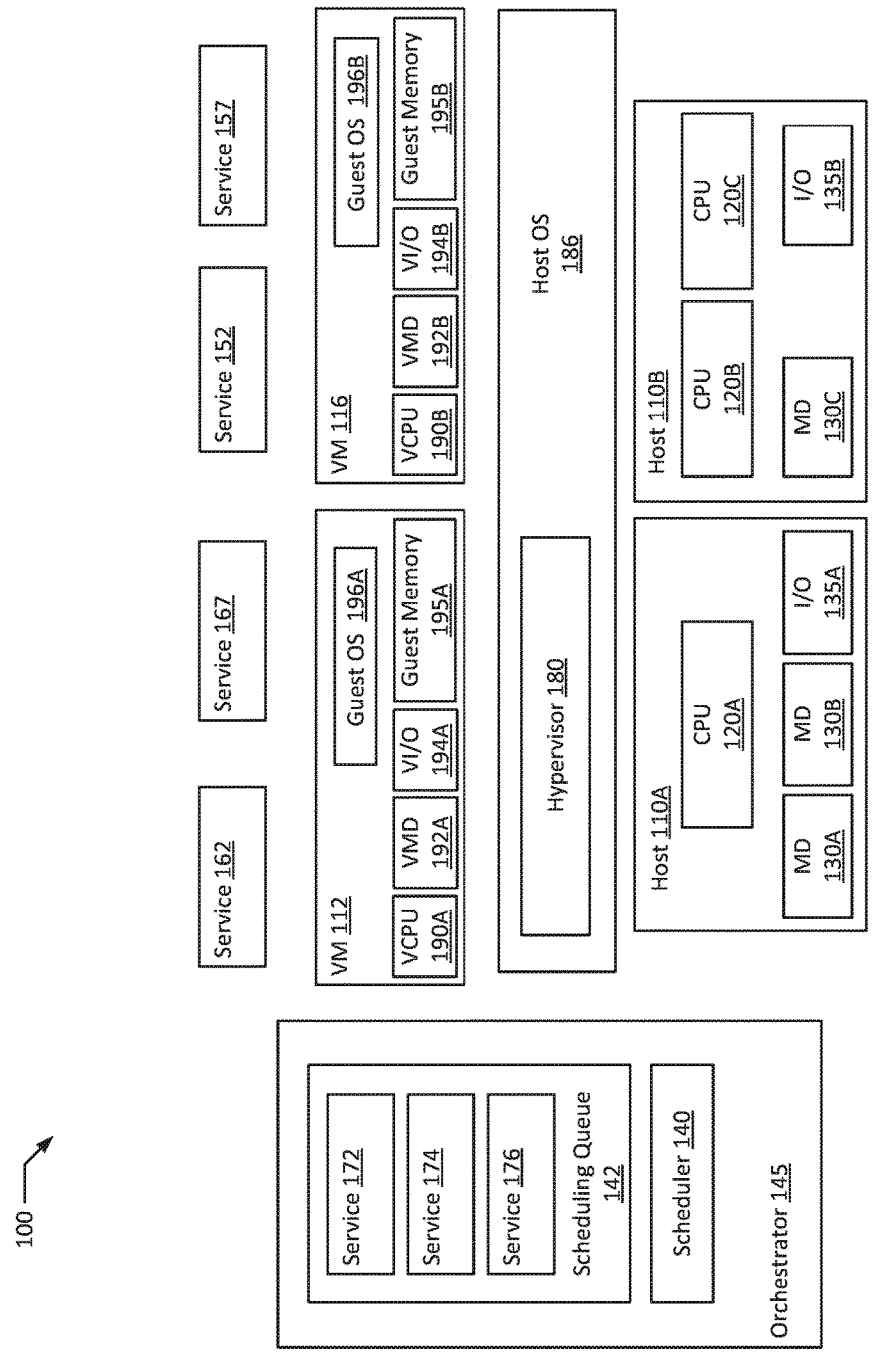
FIG. 1 is a block diagram of a system scheduling service deployments with efficient cloud service capacity scaling according to an example of the present disclosure.

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, container based virtualization system such as Red Hat® OpenShift® or Docker® may be advantageous, as container based virtualization systems may be lighter weight than typical systems using virtual machines with hypervisors. In the case of containers, oftentimes a container will be hosted on a physical host or virtual machine that already has an operating system executing, and the container may be hosted on the operating system of the physical host or VM. To operate, these isolated guests need to have system resources allocated to them, for example, central processing unit "CPU" or "processor" (cores or shares), Graphics Processing Unit "GPU" (cores or slices), memory (size and I/O rates), persistent storage (size and I/O rates), network bandwidth, IP addresses, network routes, etc. Applications that function in unison to perform specific computing tasks may be organized and deployed as services. In some examples, a service may be deployed as one or more special purpose containers. In other examples, services may execute directly on host hardware, whether physical or virtual. Containers may allow consistent, wide spread, parallel deployment of computing power for services. In large scale implementations, schedulers generally respond to frequent container startups and cleanups with low latency.

Due to economies of scale, containers and thus container deployed services tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host.

In cloud based environments, the total computing capacity of the cloud is rarely a limiting factor for the needs of a given tenant. In a typical example, whenever a tenant requires more computing capacity for a new service to be deployed in their share of a multi-tenant cloud, the tenant's hosting arrangement with the cloud provider may generally allow for additional computing capacity (e.g., physical hosts, virtual hosts, and containers) to be deployed on short notice. In a typical arrangement, a tenant may have a fee arrangement with a cloud provider that scales based on usage. In an example, after launching additional computing capacity, that computing capacity may have a minimum lease duration before it can be returned to the cloud provider. In addition, launching additional computing capacity may be relatively quick (e.g., compared to buying new hardware and installing it in a proprietary datacenter), but may still take a substantial amount of time compared to the execution of a computing task (e.g., measured in milliseconds or seconds). As a result, when a new service is requested where the tenant is operating at or near a current maximum capacity, a default behavior of launching new computing capacity may not be optimal. On the one hand, the newly launched capacity may become underutilized overhead after the peak usage period ends, and this period may be quite short. On the other hand, the launch of the new service(s) may be unnecessarily delayed waiting for new hosts to be allocated by the cloud provider.

In addition, while additional capacity may generally be effectively unlimited, specific types of computing capacity within the cloud may be limiting. For example, if a certain service has strict network latency requirements, a cloud provider having 80% of its computing capacity available in North America does not help a tenant who needs capacity in New York City. In the example, the cloud provider may be operating at 99% capacity in New York City, but only 60-70% along the rest of the eastern seaboard, in cities like Boston, Washington D.C., Raleigh-Durham and Atlanta. In such a situation, as demand in New York City is raised, obtaining extra capacity may become cost prohibitive for the task performed by a given service. Alternatively, in low remaining capacity scenarios, the remaining capacity may be reserved for larger or more influential tenants with higher priority. Obtaining such capacity may then require circuitous arrangements with these larger or more influential tenants (e.g., as a compute capacity sub-lessee).

The present disclosure aims to address the above deficiencies, for example, relating both the delayed start of high priority services and the resulting underutilized overhead from launching additional hosts too aggressively. In an example, a given service may be assigned a latency tolerance (e.g., real-time vs. retriable). A default behavior may be that a real-time service in a scheduler queue may terminate a retriable service being executed in a plurality of isolated guests (e.g., VMs and/or containers leased by a tenant of a cloud provider). The real-time service may then execute without additional isolated guests being allocated to the tenant. A further determination may be made before a given retriable service is terminated, based on, for example, the time the retriable service spent in the scheduler queue prior to execution, and/or a completion percentage of the retriable service executing its task. A determination may then be made whether terminating the retriable service to be restarted later would be a net gain on computing efficiency. Where continuing the execution of the retriable service is more efficient, the retriable service may be elevated to real-time status, preventing termination. In some examples, retriable services may be further classified as time-bounded or deferrable, where time-bounded services may require further prioritization than deferrable such that the time-bounded service is executed before a critical time threshold passes after which execution of the time-bounded service becomes an immediate priority requiring an elevation to the real-time latency tolerance. With the addition of latency tolerance based classification to a scheduler, allocation of additional isolated guests may be minimized and existing compute resources may be utilized to a significantly higher degree.

FIG. 1 is a block diagram of a system scheduling service deployments with efficient cloud service capacity scaling according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, hosts 110A-B may run one or more isolated guests, for example, services 152, 157, 162, and 167 may execute on containers that may be isolated guests. In an example, a container hosting any of services 152, 157, 162, and 167 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a cluster that may be deployed together (e.g., in a Kubernetes® pod). In an example, containers belonging to the same cluster may be deployed simultaneously by a scheduler 140. In an example, a given service may require the deployment of multiple containers and/or pods in multiple physical locations. In an example, containers hosting services 152, 157, 162, and 167 may be executing on VMs 112 and 116. In another example, containers hosting services 152, 157, 162, and 167 may be executing directly on hosts 110A-B without a virtualized layer in between. In an example, services 152, 157, 162, and 167 may execute directly on VMs 112 and 116 or on hosts 110A-B without an additional layer of virtualization in between.

System 100 may run one or more VMs 112 and 116, by executing a software layer (e.g., hypervisor 180) above the hardware and below the VMs 112 and 116, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to VMs 112 and 116 as devices, including virtual processors 190A-B, virtual memory devices 192A-B, virtual I/O devices 194A-B, and/or guest memory 195A-B. In an example, a container may execute on a VM that is not virtualized, (e.g., executing directly on host operating system 186).

In an example, a VM 112 may be a virtual machine and may execute a guest operating system 196A which may utilize the underlying virtual central processing unit ("VCPU") 190A, virtual memory device ("VMD") 192A, and virtual input/output ("VI/O") devices 194A. One or more containers that may host services 162 and 167 may be running on a VM 112 under the respective guest operating system 196A. Processor virtualization may be implemented by the hypervisor 180 scheduling time slots on one or more physical processors 120A-C such that from the guest operating system's perspective those time slots are scheduled on a virtual processor 190A.

A VM 112 may run on any type of dependent, independent, compatible, and/or incompatible applications on the underlying hardware and host operating system 186. In an example, services 162 and 167 running on VM 112 may be dependent on the underlying hardware and/or host operating system 186. In another example, services 162 and 167 running on VM 112 may be independent of the underlying hardware and/or host operating system 186. In an example, services 162 and 167 running on VM 112 may be compatible with the underlying hardware and/or host operating system 186. Additionally, services 162 and 167 running on VM 112 may be incompatible with the underlying hardware and/or OS. In an example, a device may be implemented as a VM 112. The hypervisor 180 may manage memory for the host operating system 186 as well as memory allocated to the VM 112 and guest operating systems 196A such as guest memory 195A provided to guest OS 196A. In an example, VM 116 may be another virtual machine similar in configuration to VM 112, with VCPU 190B, VMD 192B, VI/O 194B, guest memory 195B, and guest OS 196B operating in similar roles to their respective counterparts in VM 112. The VM 116 may host services 152 and 157.

In an example, scheduler 140 may be a component part of a container orchestrator 145 such as Kubernetes® or Docker Swarm®. In other examples, scheduler 140 may be a stand alone component. In the example, scheduler 140 may be in communication with both hosts 110A-B. In an example, the scheduler 140 may be connected to a scheduling queue 142. In various examples, scheduling queue 142 may be stored in any suitable format (e.g., a file, a database, a directory, a registry, or a messaging queue). In an example, scheduling queue 142 may include multiple services (e.g., services 172, 174, and 176) that may be awaiting deployment to VMs 112 and 116. In some examples, scheduler 140, scheduling queue 142, and hosts 110A-B may reside over a network from each other, which may be, for example, a public network (e.g., the Internet), a private network (e.g., a local area network (LAN) or wide area network (WAN)), or a combination thereof.

Figure 2:
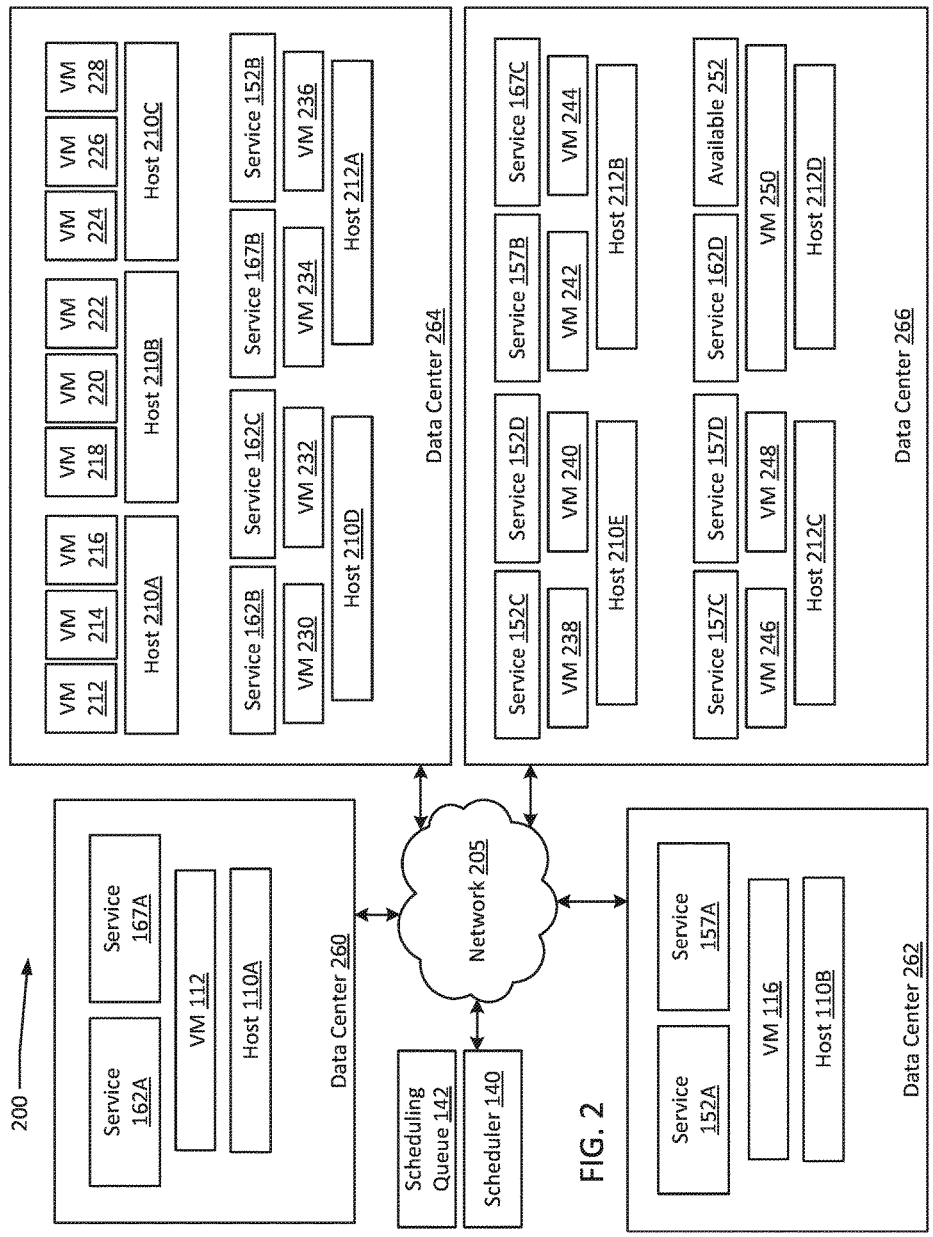
FIG. 2 is a block diagram of scheduling service deployments across a multi-region cloud environment with efficient cloud service capacity scaling according to an example of the present disclosure.

FIG. 2 is a block diagram of scheduling service deployments across a multi-region cloud environment with efficient cloud service capacity scaling according to an example of the present disclosure. In an example, scheduler 140 may be a scheduler responsible for deploying services (e.g., services 152A-D, 157A-D, 162A-D, 167A-C) to VMs (e.g., VMs 112, 116, 212, 214, 216, 218, 220, 222, 224, 226, 228, 230, 232, 234, 236, 238, 240, 242, 244, 246, 248, and 250) to provide a variety of distributed services. In an example, containers 152A-D may pass data among each other to provide a distributed service, such as delivering advertisements. In an example, services 157A-D may be copies of the same container delivering a search functionality for a website. In an example, VMs 112, 116, 212, 214, 216, 218, 220, 222, 224, 226, 228, 230, 232, 234, 236, 238, 240, 242, 244, 246, 248, and 250 execute on hosts 110A-B, 210A-E, and 212A-D. In an example, hosts 110A-B may have the same specifications as each other, and hosts 210A-E may have the same specifications as each other, but different from hosts 110A-B, and hosts 212A-D may have a third set of specifications. In an example, all of the components in system 200 may communicate with each other through network 205.

In an example, data center 260 may represent a Houston building, data center 262 may represent a Chicago building, data center 264 may represent a Secaucus, N.J. building, data center 266 may represent a Manhattan, N.Y. building. In an example, each of hosts 110A-B, 210A-E, and 212 A-D may be a server hosted in the data center each respective host is schematically depicted in. In an example, each VM of VMs 112, 116, 212, 214, 216, 218, 220, 222, 224, 226, 228, 230, 232, 234, 236, 238, 240, 242, 244, 246, 248, and 250 may have lower network latency communicating with other VMs in a similar geographic location. Each service (e.g., services 152A-D, 157A-D, 162A-D, 167A-C) hosted on each VM may therefore also perform with lower latency when communicating with other services or with clients in a similar geographical area. In an example, different copies of a service may be distributed geographically to better serve regional clients. In another example, a service may be required to be deployed in a certain data center (e.g., data centers 260, 262, 264, or 266) based on latency requirements or hardware configuration requirements specific to such a data center. For example, services 157A-D may be copies of the same container executing the same service. Three copies of this service (e.g., services 157B-D) may be preferentially deployed to data center 236 due to a client database being deployed in the same data center 266.

In an example, scheduler 140 including scheduling queue 142 may be located on physical hardware in one of data centers 260, 262, 264, and 266. In another example, scheduler 140 including scheduling queue 142 may be located in another location. In some examples, each data center of system 200 (e.g., data centers 260, 262, 264, and 266) schematically depicted in FIG. 2 may belong to the same multi-tenant cloud provider. In an example, scheduler 140 may execute in a cloud environment provided by the multi-tenant cloud provider of system 200. In another example, scheduler 140 may execute on proprietary hardware owned and operated by a tenant of the multi-tenant cloud provider. In an example, each VM (e.g., VMs 112, 116, 212, 214, 216, 218, 220, 222, 224, 226, 228, 230, 232, 234, 236, 238, 240, 242, 244, 246, 248, and 250) in system 200 may be allocated to the same tenant. In an example, available capacity 252 represents capacity for VM 250 to host another container (e.g., services 172, 174, or 176) from the scheduling queue 142. In an example, certain services may operate functionally with a less than optimal number of copies executing. In the example, copies of such services may be specially targeted for termination for freeing up computing capacity for real-time latency tolerance services in scheduling queue 142.

Figure 3:
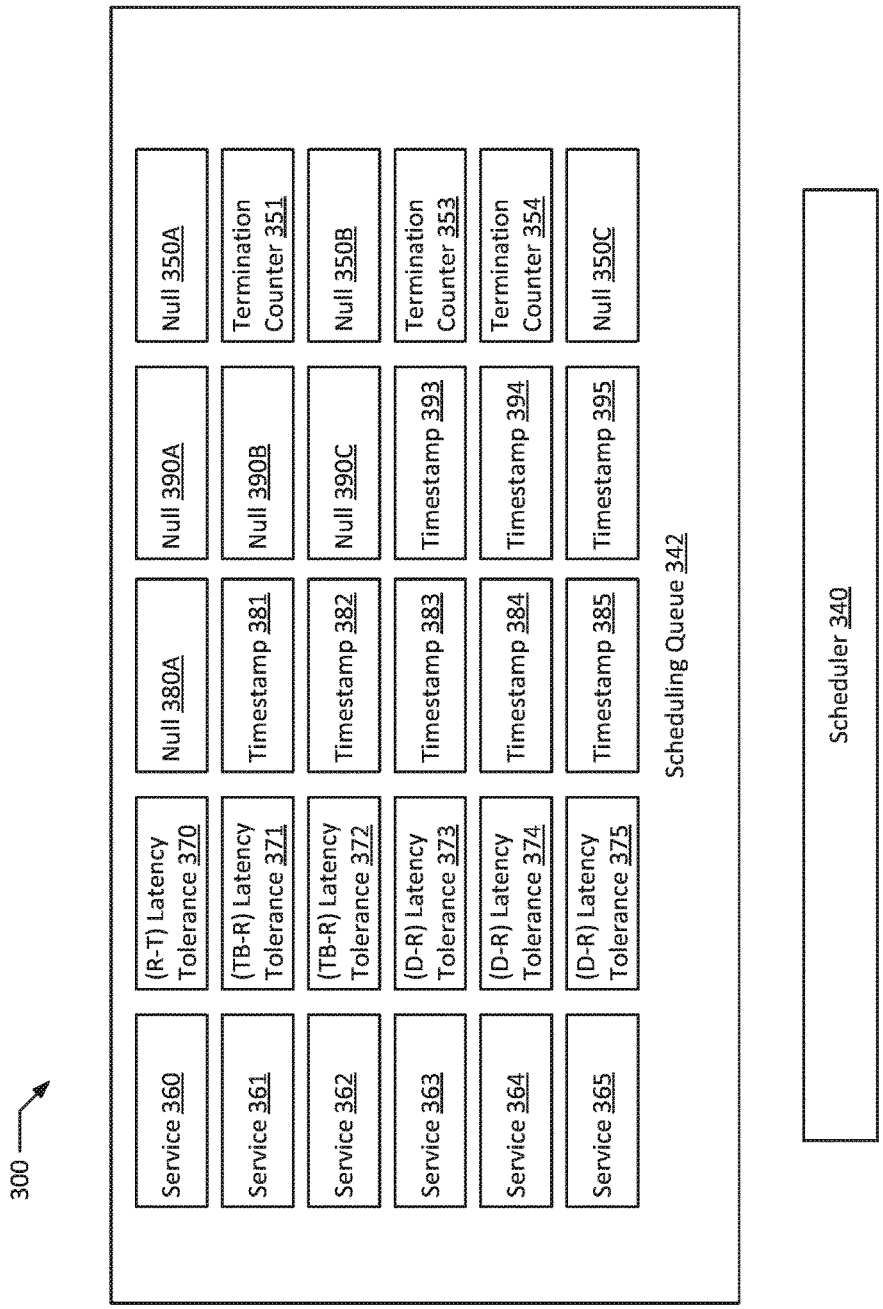
FIG. 3 is a block diagram of a scheduling queue data structure for efficient cloud service capacity scaling according to an example of the present disclosure.

FIG. 3 is a block diagram of a scheduling queue data structure for efficient cloud service capacity scaling according to an example of the present disclosure. In an example system 300, scheduling queue 342 may include six services (e.g., services 360-365). In the example, the top service in the schematic representation of FIG. 3 (e.g., service 360) may be the first service scheduled, while the lowest service in the schematic representation of FIG. 3 (e.g., service 365) may be the last service scheduled. In an example, each service in scheduling queue 342 (e.g., service 360-365) is associated with a respective latency tolerance (e.g., latency tolerance 370-375). In an example, each service may be further associated with one or two timestamps (e.g., timestamps 381-385, and timestamps 393-395). In an example, null 380A, and nulls 390A-C represent null values for possible timestamp associations. In such examples where services (e.g., services 360-365) are associated with timestamps (e.g., timestamps 381-385 and timestamps 393-395), the time in such a timestamp may be a factor for elevating a service to the real-time lower latency tolerance. Decisions to elevate priority may be influenced by a variety of factors in various systems in addition to or in place of timestamps. For example, a timer for time spent in queue, a counter of a quantity of terminations a service has experienced without completion, or a user request.

In example scheduling queue 342, service 360 is in the real-time latency tolerance 370, and being already in the real-time latency tolerance, it has no associated time stamps (e.g., null 380A and null 390A), and has never been terminated (e.g., null 350A). Service 361 may be in a time-bounded retriable latency tolerance 371 associated with one timestamp (e.g., timestamp 381 and null 390B) that has been terminated once previously (e.g., termination counter 351). Service 362 may be in a time-bounded retriable latency tolerance 372 associated with one timestamp (e.g., timestamp 382 and null 390C) that has not been previously terminated (e.g., null 350B). Service 363 may be in a deferrable retriable latency tolerance 373 associated with two timestamps (e.g., timestamps 383 and 393) that has been terminated three times previously (e.g., termination counter 353). Service 364 may be in a deferrable retriable latency tolerance 374 associated with two timestamps (e.g., timestamps 384 and 394) that has been terminated one time previously (e.g., termination counter 354). Service 365 may be in a deferrable retriable latency tolerance 375 associated with two timestamps (e.g., timestamps 385 and 395) that has not been previously terminated (e.g., null 350C). In an example, a first timestamp (e.g., timestamps 381-385) associated with each service (e.g., services 361-365) is a timestamp for a time at which a given service (e.g., services 361-365) may be elevated to the next higher latency tolerance (e.g., deferrable retriable to time-bounded retriable, or time-retriable to real-time). For example, the first timestamp (e.g., timestamps 381-385) may be a time in the future where an on time completion of the respective service associated with the timestamp (e.g., services 361-365) may be in jeopardy even if execution of the service began immediately. In an example, a second timestamp (e.g., timestamps 393-395) associated with services 363-365, may represent a time at which a given service (e.g., services 363-365) originally entered scheduling queue 342 before any terminations to facilitate first in first out ("FIFO") scheduling. In an example, termination counters 351, 353, and 354 may be important indicators of necessary elevations in latency tolerance (e.g., a high termination counter may be indicative of an inability for the system to secure enough computing capacity for the service without an elevation of latency tolerance). In an example, the amount of time a given service spends at or near the top of the scheduling queue 342 without being scheduled may also be an indicator that the service needs to have its latency tolerance elevated or it may be in stuck in scheduling queue 342 indefinitely.

In typical multi-tenant cloud environments, a scheduler may request to scale up the quantity of isolated guests allocated to a specific tenant when a request to launch a service that cannot be fulfilled from current capacity is received. In an example practicing efficient cloud service capacity scaling, a service (e.g., services 363-365) in the deferrable retriable latency tolerance (e.g., latency tolerance 373-375) may not have privileges to request the allocation of additional isolated guests. Therefore, in an example, deferrable retriable latency tolerance services (e.g., services 363-365) may only execute where there is existing capacity in the plurality of isolated guests allocated to a tenant. In comparison, a service in the time-bounded retriable latency tolerance (e.g., latency tolerance 371-372) may place low priority requests for additional isolated guest allocation. For example, scheduler 340 may first attempt to terminate a deferrable retriable latency tolerance service that is executing to create capacity for a time-bounded retriable latency tolerance service (e.g., services 361 and 362), as opposed to starting an additional isolated guest. In an example, failing to find a deferrable retriable latency tolerance service to terminate, scheduler 340 may reactivate isolated guests previously placed in hibernation for service 361 and service 362. In another example, scheduler 340 may activate pre-purchased contingency computing capacity for service 361 and service 362 (e.g., where a tenant's relationship with a cloud provider allows for a certain number of overflow hours per day/week/month above the tenant's standard footprint). In a further example, scheduler 340 may query the cloud provider or other tenants of the multi-tenant cloud to determine whether the cloud provider or any other tenant would be willing to temporarily lease or sub-lease additional capacity at below market rates. In another related example, scheduler 340 may have a standing below market offer in place after scheduling queue 342 reaches a certain size (e.g., a certain amount of required processing time calculated based on the real-time latency tolerance and time-bounded retriable latency tolerance services in scheduling queue 342). The cloud provider and/or other tenants may then accept the offer and lease/sub-lease computing capacity to scheduler 340. In such examples, services 361 and 362 may be executed on such additional isolated guests procured at below market rates. In an example, real-time latency tolerance service 360 may receive computing capacity to execute in any of the above listed ways specified for time-bounded retriable latency tolerance services 361 and 362. In the example, in addition to requesting access to computing capacity similarly to time-bounded retriable latency tolerance services 361 and 362, scheduler 340 may purchase additional computing capacity from the cloud provider at the cloud provider's then current market rate for immediate allocation to host real-time latency tolerance service 360. In an example, such allocations take time, and during the start-up time, an existing host may be found for service 360, and therefore the new host may then host another queued service (e.g., a service terminated to make room for service 360).

In an example, a scheduling priority of services 360-365 in scheduling queue 342 may be based on first latency tolerances 370-375, then timestamps 381-385, and finally timestamps 393-395. However, other factors may influence scheduling priorities as well. In an example, service 363 may be prioritized over services 364 and 365 even though service 363 has a later timestamp 393 than timestamps 394 and 395. For example, service 363 may have been originally added to the scheduling queue 342 long before services 364 and 365. In addition, in an example, service 363 may have begun executing one or more times but then been terminated to make room for services with time-bounded retriable and/or real-time latency tolerances. In an example, service 363 may have progressed far enough towards completion when previously executing before being terminated that a user may expect to receive results well before timestamp 393 elapses. In such an example, service 363 may be scheduled again before services 364 and 365 with earlier absolute deadlines.

Figure 4:
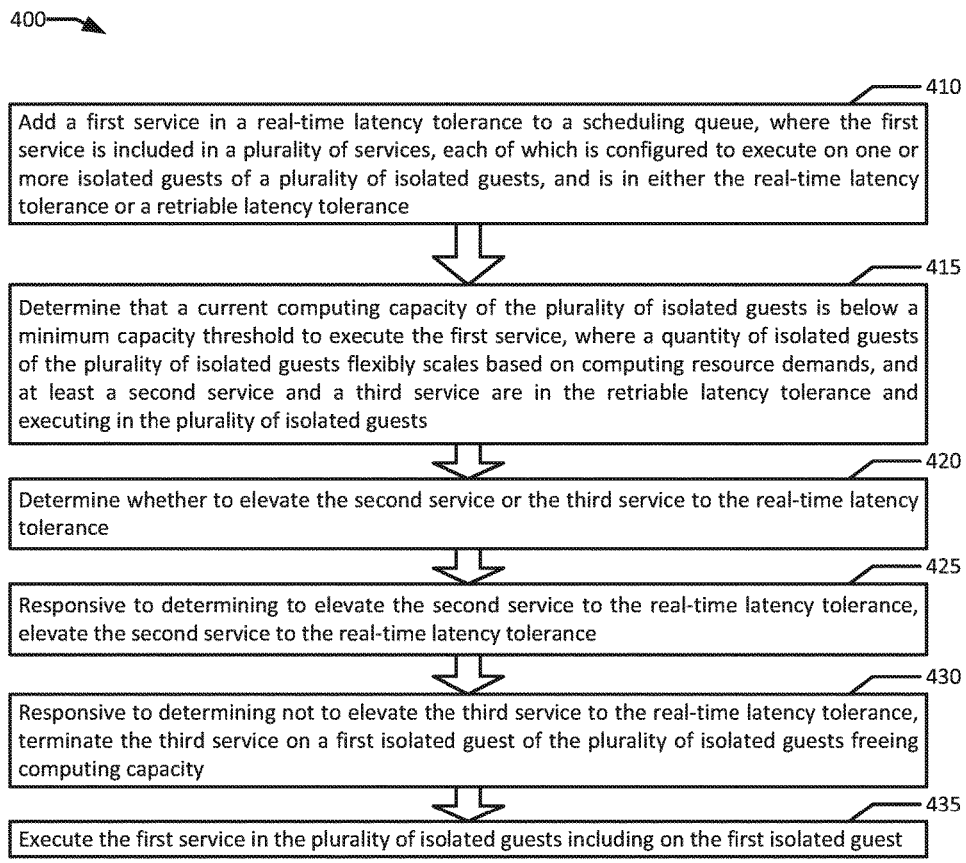
FIG. 4 is a flowchart illustrating an example of efficient cloud service capacity scaling according to an example of the present disclosure.

FIG. 4 is a flowchart illustrating an example of efficient cloud service capacity scaling according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by scheduler 140.

A first service in a real-time latency tolerance is added to a scheduling queue, where the first service is included in a plurality of services, each of which is configured to execute on one or more isolated guests of a plurality of isolated guests, and is in either the real-time latency tolerance or a retriable latency tolerance (block 410). In an example, scheduler 140 may add service 172 in the real-time latency tolerance to scheduling queue 142. In an example, service 172 may be configured to execute on either VM 112 or VM 116.

A current computing capacity of the plurality of isolated guests is determined to be below a minimum capacity threshold to execute the first service, where a quantity of isolated guests of the plurality of isolated guests flexibly scales based on computing resource demands, and at least a second service and a third service are in the retriable latency tolerance and executing in the plurality of isolated guests (block 415). In an example, VM 112 and VM 116 may have a computing capacity indicative of a quantity of services that may be hosted by VM 112 and VM 116. In the example, due to services 152, 157, 162 and 167 currently executing in VMs 112 and 116, the current computing capacity that is free to execute service 172 may be below a minimum capacity threshold (e.g., the least computing resources service 172 requires to execute properly). In an example, network latency, processor cores, processor speed, memory size, GPU cores, and memory associated with an isolated guest of the plurality of isolated guests may all be factors associated with the computing capacity of VMs 112 and 116. In an example, scheduler 140 may request hypervisor 180 for an additional VM to be launched to host additional services if and when such additional VMs are necessary. In an example, services 152 and 157 are in the retriable latency tolerance. In an example, the quantity of isolated guests available to host services may flexibly scale based on scheduler 140 requesting the activation of (i) existing isolated guests in hibernation, (ii) new isolated guests provisioned with a delay, and (iii) new isolated guests provisioned immediately. In the example, services in the time-bounded retriable latency tolerance may trigger low priority requests for additional isolated guests to be added, which may be fulfilled first by activating existing isolated guests in hibernation, and then by activating new isolated guests provisioned with a delay. Meanwhile, real-time latency tolerance services may trigger high priority requests to add new isolated guests, which may fulfilled by activating isolated guests of any type, including those to be provisioned immediately.

A determination is made whether to elevate at least one of the second service and the third service to the real-time latency tolerance (block 420). In an example, a real-time latency tolerance service 172 may be prioritized over retriable latency tolerance service 152 and 157. In the example, scheduler 140 may terminate service 152 and/or service 157 to create computing capacity to execute service 172. In an example, various factors may be considered to determine whether service 152 and/or service 157 should be elevated to the real-time latency tolerance so that the service would be immunized from being terminated to make room for service 172. For example, scheduler 140 may find that service 152 is in a time-bounded retriable latency tolerance as compared to service 157 being a deferrable retriable latency tolerance service. In another example, service 152 may have a completion percentage such that terminating service 152 and restarting may be overall inefficient for system 100. For example, in a typical example, terminating a service implemented as a container may cause system 100 to lose all of the current progress towards the completion of execution of such a service. In an example, if a service (e.g., service 162) is terminated, the memory both transitory and non-transitory previously allocated to service 162 may be wiped clean in order to free up memory capacity for a service (e.g., service 172) that replaces service 162 in execution. In such examples, even if service 152 is a very low priority weekly backup service, if service 152 normally requires six hours to execute, after hour three has elapsed, starting over from zero is rarely going to be the most efficient choice for system 100. Therefore even a low priority task may be elevated to real-time latency tolerance under specific circumstances.

In response to determining to elevate the second service to the real-time latency tolerance, the second service is elevated to the real-time latency tolerance (block 425). In an example, sufficient factors in favor of elevating service 152 to the real-time latency tolerance may be found by scheduler 140 to elevate service 152 to the real-time latency tolerance. In one example, service 152 may be close enough to completion that cancelation would be highly inefficient. In another example, service 152 may have been previously terminated a threshold quantity of times, thus meriting preferential scheduling. In another example, a timestamp associated with service 152 may have elapsed, the timestamp being a trigger to elevate service 152 to the real-time latency tolerance if service 152 were still awaiting scheduling. Additional considerations may be evaluated regarding whether to elevate service 152 to the real-time latency tolerance.

In response to determining not to elevate the third service to the real-time latency tolerance, the third service is terminated on a first isolated guest of the plurality of isolated guests, freeing computing capacity (block 430). In an example, service 157 may be terminated for failing to be associated with sufficient completion percentage, expected completion time, quantity of previous terminations, etc. to be elevated to the real-time latency tolerance. In the example, scheduler 140 may terminate service 157. After terminating service 157, scheduler 140 may add service 157 back to scheduling queue 142 to await rescheduling. In an example, service 157 may be added back to scheduling queue 142 at its then current latency tolerance (e.g., a deferrable retriable latency tolerance). In other examples, scheduler 140 may elevate service 157 to a higher latency tolerance (e.g., the time-bounded latency tolerance) upon placing service 157 back in queue (e.g., after a threshold quantity of terminations). In an example, service 157 may be executing in a physical location (e.g., data center) that may be optimal for service 172, but service 157 does not have similar physical location requirements.

The first service is executed in the plurality of isolated guests including on the first isolated guest (block 435). For example, after the termination of service 157, scheduler 140 may assign service 172 to VM 116, and service 172 may begin executing on VM 116. In an example, each service may include a set of performance criteria requirements associated with each respective service. In an example, a service 174 in the real-time latency tolerance may be added to scheduling queue 142. In the example, it may be determined that the current computing capacity of VMs 112 and 116 is below a minimum threshold to execute service 174. Scheduler 140 may then determine that service 167 is executing in the retriable latency tolerance and may be terminated; however, it may also be determined that terminating service 167 would fail to free up enough performance criteria to meet a set of performance criteria requirements of service 174. For example, service 167 may require less processor cores, processor speed, memory size, GPU cores, and/or non-transitory storage (e.g., memory) performance. In the example, service 167 may continue execution while service 174 waits for an isolated guest that meats service 174's performance criteria requirements. For example, such an isolated guest may become available from (i) a completion of execution of a service, (ii) a termination of a service, and/or (iii) a fulfillment of a high priority request to add an isolated guest with sufficient performance criteria. In an example, service 174 may require being located in a specific data center due to latency requirements, and that data center may be over capacity, so even as a real-time latency tolerance service, service 174 may have to wait in scheduling queue 142 while retriable latency tolerance services are scheduled and executed.

Figure 5A:
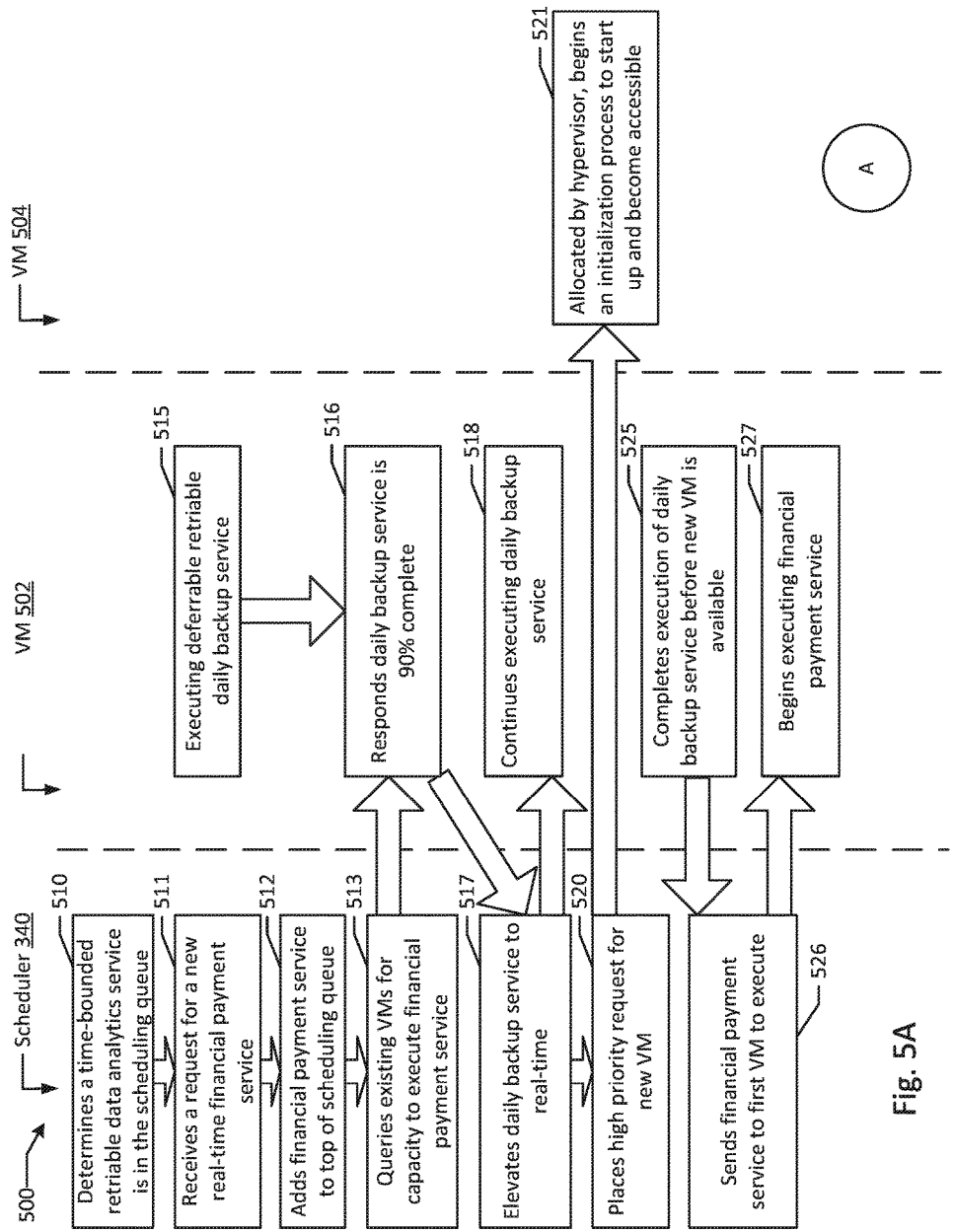
FIGS. 5A, 5B, and 5C are flow diagrams illustrating an example system scheduling service deployments with efficient cloud service capacity scaling according to an example of the present disclosure.
Figure 5B:
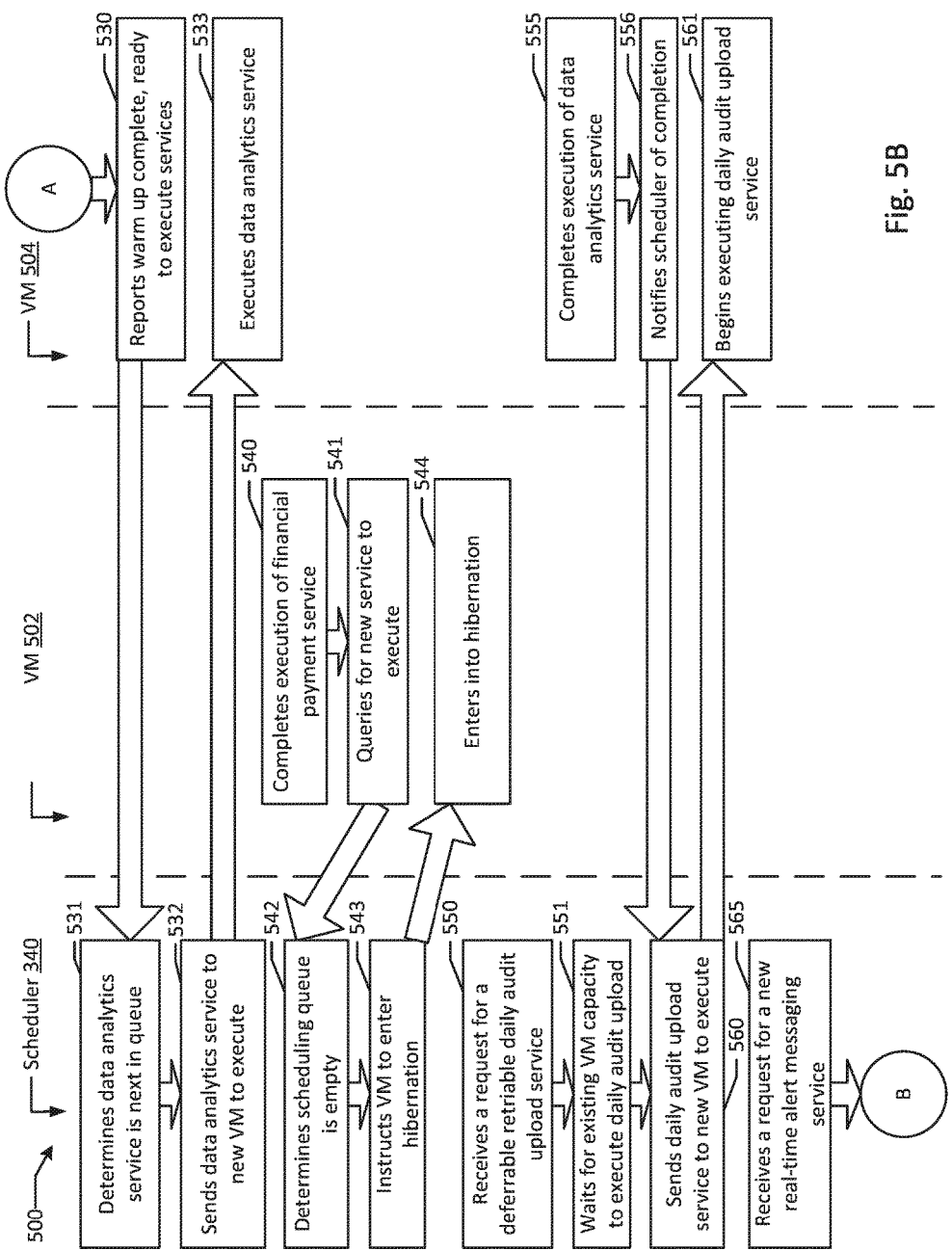
Figure 5C:
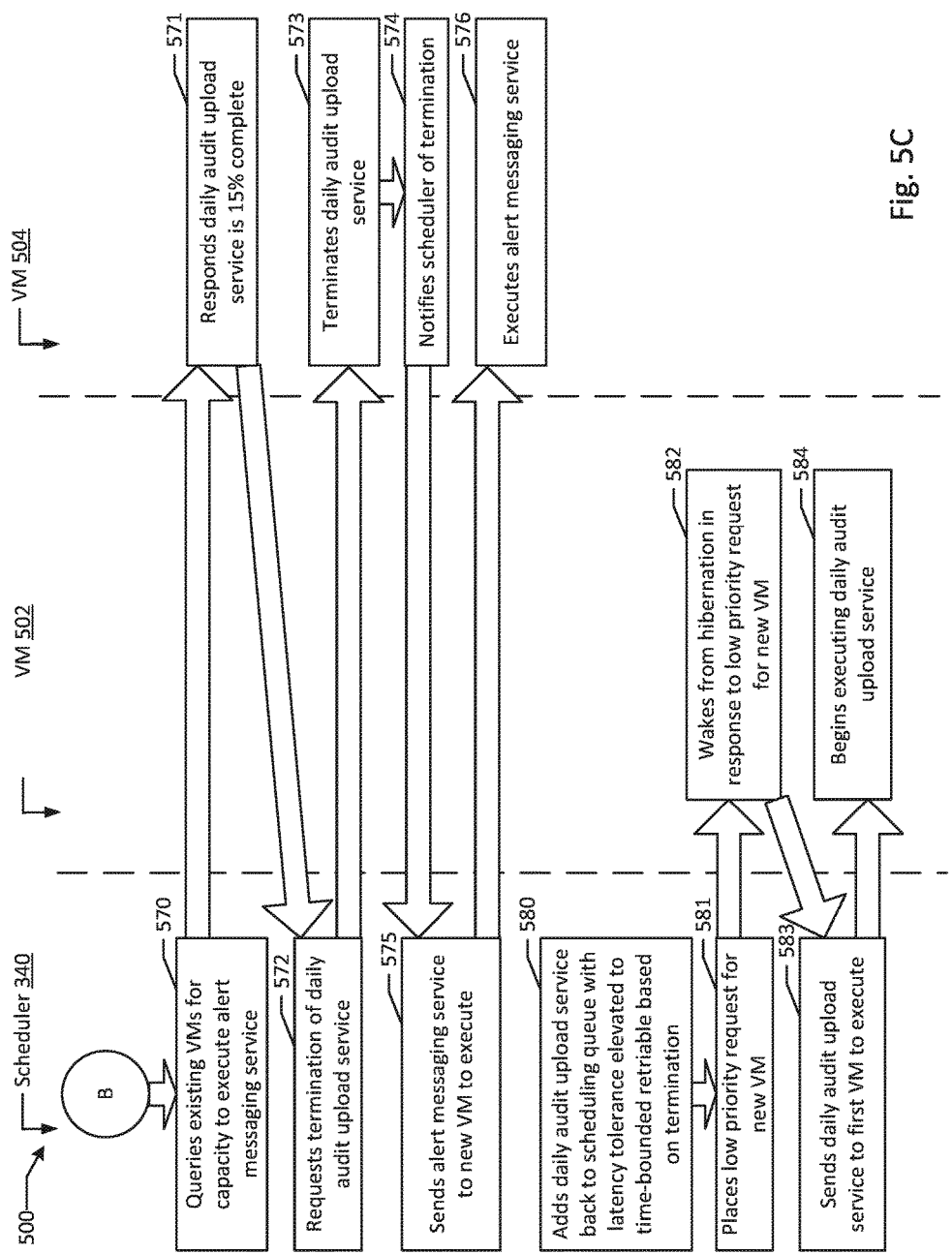

FIGS. 5A, 5B, and 5C are flow diagrams illustrating an example system scheduling service deployments with efficient cloud service capacity scaling according to an example of the present disclosure. Although the example method 500 is described with reference to the flowchart illustrated in FIGS. 5A, 5B, and 5C, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method is performed by scheduler 340 interacting with VMs 502 and 504.

In an example, a scheduler 340 determines that a time-bounded retriable data analytics service 361 is in scheduling queue 342 (block 510). In an example, scheduler 340 then receives a request for a new financial payment service 360 in the real-time latency tolerance 371 (block 511). In the example, financial payment service 360 may be more prioritized entering the scheduling queue 342 than data analytics service 361. For example, the financial payment service 360 may be added to the top of scheduling queue 342 (block 512). Scheduler 340 may then determine that financial payment service 360 is currently at the top of the scheduling queue 342 awaiting scheduling. Scheduler 340 may query a plurality of existing VMs including VM 502 to determine if the VMs have current computing capacity to execute financial payment service 360 (block 513). In an example, VM 502 may be executing a daily backup service in the deferrable retriable latency tolerance (block 515). VM 502, however, may respond to scheduler 340 upon being queried, that the daily backup service is 90% complete (block 516). Based on the completion percentage of the daily backup service, scheduler 340 may elevate the daily backup service to the real-time latency tolerance (block 517). Due to the upgrade of the daily backup service to the real-time latency tolerance, VM 502 may continue to execute the daily backup service (block 518). In various other examples, scheduler 340 may elevate the daily backup service to the real-time latency tolerance for a variety of reasons, including but not limited to (i) an expected completion time of the second service, (ii) a completion percentage of the second service, (iii) a time to completion of the second service, and (iv) a quantity of previous terminations of the second service.

In an example, after elevating the daily backup service to the real-time latency tolerance, scheduler 340 may determine that there is insufficient current compute capacity to execute financial payment service 360 with no way to free up sufficient capacity by terminating existing retriable latency tolerance services. In an example, scheduler 340 may then place a high priority request for a new VM (block 520). For example, scheduler 340 may request hypervisor 180 to launch a new VM assigned to the same tenant as VM 502. In an example, a high priority request may be fulfilled by demanding instant, on demand computing capacity from a cloud provider. In an example, prior to launching a brand new VM, scheduler 340 may first try to request for a VM currently in hibernation (which may have been unavailable). Scheduler 340 may then have queried other tenants of a multi-tenant cloud regarding whether the other tenants could temporarily spare some computing capacity (which request may have been rejected). In an example, VM 504 is allocated by hypervisor 180 and begins an initialization process to start up and become accessible (block 521). In an example, VM 502 may complete execution of the daily backup service before the new VM 504 is available to execute financial payment service 360 (block 525). In the example, scheduler 140 may be notified of the completion of the daily backup service. Scheduler 340 may then send the financial payment service 360 to be executed on VM 502 (block 526). VM 502 may begin executing financial payment service 526 (block 527).

In an example, VM 504 may then report to scheduler 340 that VM 504 has completed warming up and is ready to execute services (block 530). Scheduler 340 may determine that data analytics service 361 is next in scheduling queue 342 (block 531). In an example, data analytics service 361 is sent to execute on VM 504 (block 532). VM 504 may then begin executing the data analytics service 571 (block 533). In an example, data analytics service 561, being in the time-bounded retriable latency tolerance, would only have been able to trigger a low priority request for a new VM as a host, and scheduler 340 would not have requested for VM 504 if service 561 had been at the top of the scheduling queue 342 rather than financial payment service 360. However, once allocated, VM 504 may not be returnable for a period of time, and therefore executing data analytics service 361 improves the overall compute efficiency of system 500.

VM 502 may then complete execution of the financial payment service 360 (block 540). VM 502 then queries scheduler 340 for a new service to execute (block 541). In an example, scheduler 340 may determine that scheduling queue 341 is empty (block 542). For example, all services waiting for execution on scheduling queue 341 may have been allocated to VMs to execute. Scheduler 340 may then instruct VM 502 to enter into hibernation (block 543). In an example, entering hibernation may be a middle ground between returning capacity to a cloud provider and keeping a VM fully operational. In an example, hibernation requires less energy use, and may additionally allow for decreasing the allocation of certain resources to VM 502 (e.g., network bandwidth), potentially freeing those resources for other VMs (e.g., VM 504). In an example, VM 502 enters into hibernation (block 544). In an example, a minimum lease duration on VM 502 may have not yet elapsed, and therefore returning VM 502 to the cloud provider may not have been possible or helpful.

With VM 502 in hibernation and VM 504 executing data analytics service 361, scheduler 340 may receive a request for the execution of a daily audit upload service 363 in the deferrable retriable latency tolerance 373 (block 550). In an example, scheduler 340 may add daily audit upload service 363 to scheduling queue 342 in the top position. Scheduler 340 may then wait for existing active VM capacity to execute daily audit upload service 363 (block 551). In an example, as a deferrable retriable service, daily audit upload service 363 does not trigger a low priority request for additional VMs, which may activate VM 502 from hibernation. Daily audit upload service 363 also does not trigger the termination of any other services as a deferrable retriable service. In an example, VM 504 then completes the execution of data analytics service 361 (block 555). VM 504 then notifies scheduler 340 that it has completed executing data analytics service 361 (block 556). In response, scheduler 340 may send daily audit upload service 363 to VM 504 to execute (block 560). VM 504 may then begin executing daily audit upload service 363 (block 561).

Scheduler 340 may then receive a request for the execution of an alert messaging service in the real-time tolerance (block 565). In an example, scheduler 340 may add the alert messaging service to scheduling queue 342 in the top position. In another example, with no other service in the scheduling queue having priority over the alert messaging service, scheduler 140 may process the request for the alert messaging service without queueing the request. Scheduler 340 may then query existing VMs to determine if there is capacity to execute the alert messaging service (block 570). In an example, VM 504 may respond that the daily audit upload service 363 is only 15% complete (block 571). Scheduler 340 may then request for the termination of the daily audit upload service 363 (block 572). In an example daily audit upload service 363 may be selected for termination as the deferrable retriable service currently executing with the lowest completion percentage. VM 504 may then terminate daily audit upload service 363 (block 573). VM 504 may then notify scheduler 340 of the termination of daily audit upload service 363 (block 574). In response, scheduler 340 may send the alert messaging service to VM 504 for execution (block 575). VM 504 executes the alert messaging service after receipt (block 576).

In an example, scheduler 340 may add the daily audit upload 363 service back to scheduling queue 342, elevated to the time-bounded retriable latency tolerance, in part based on the earlier termination (block 580). As a result of the change in latency tolerance from deferrable retriable 373 to time-bounded retriable, scheduler 340 now places a low priority request for a new VM to execute daily audit upload service 363 (block 581). In an example, VM 502 wakes from hibernation in response to the low priority request for a new VM (block 582). In the example, scheduler 340 may then send daily audit upload service 363 to VM 502 for execution (block 583). VM 502 may then begin executing daily audit upload service 363 (block 584).

Figure 6:
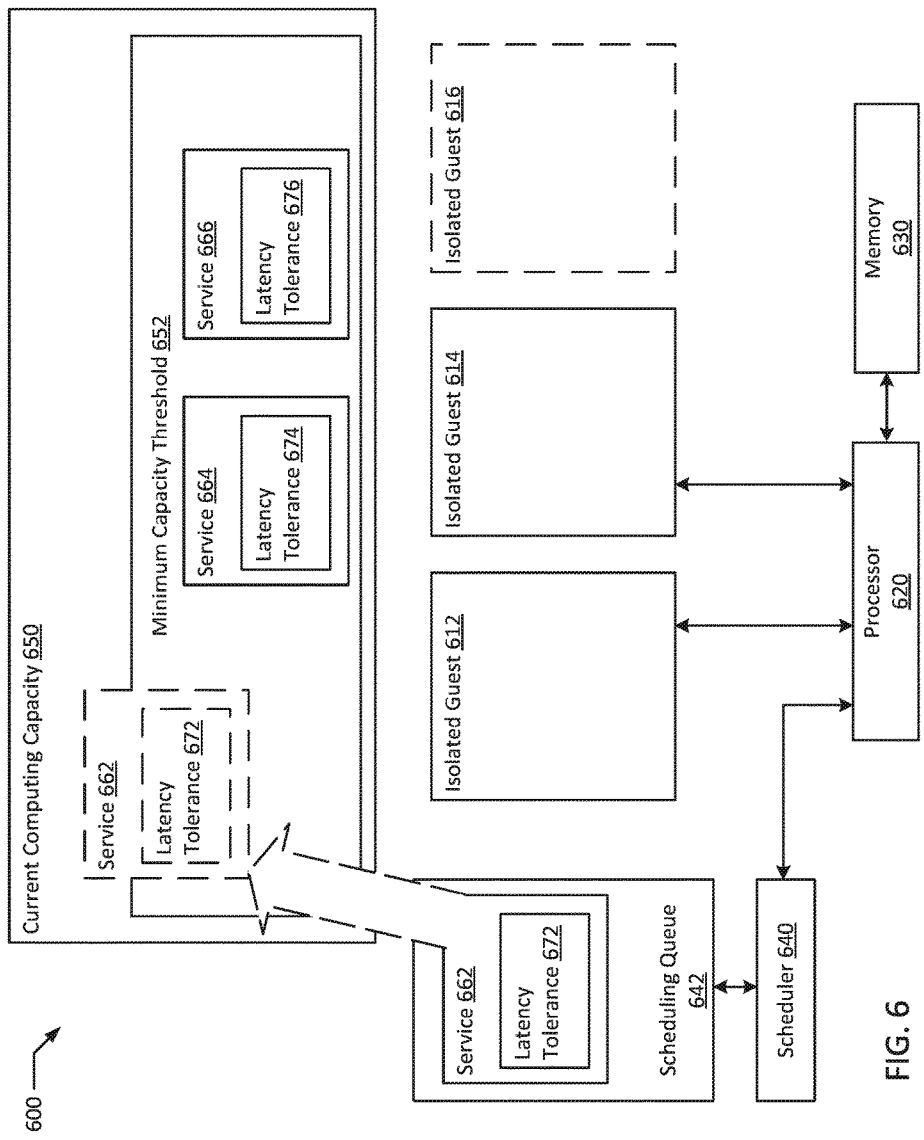
FIG. 6 is a block diagram of a system scheduling service deployments with efficient cloud service capacity scaling according to an example of the present disclosure.

FIG. 6 is a block diagram of a system scheduling service deployments with efficient cloud service capacity scaling according to an example of the present disclosure. Example system 600 may include processor 620 communicatively coupled with memory 630. A plurality of isolated guests (e.g., isolated guests 612 and 614) execute on processor 620, where a quantity of isolated guests of the plurality of isolated guests (e.g., isolated guests 612 and 614) flexibly scales based on computing resource demands (e.g., isolated guests 612 and 614 scaling up to isolated guests 612, 614, and 616). A plurality of services (e.g., service 662, 664 and 666), each configured to execute on isolated guests 612 and 614, include services 662, 664, and 666, where each service of the plurality of services (e.g., service 662, 664 and 666), is in either a real-time latency tolerance 672 or a retriable latency tolerance (e.g., latency tolerance 674 or 676). A scheduling queue 642 and a scheduler 640 execute on processor 620.

In an example, scheduler 640 adds service 662 in the real-time latency tolerance 672 to the scheduling queue 642. Schedule 640 then determines that a current computing capacity 650 of isolated guests 612 and 614 is below a minimum capacity threshold 652 to execute service 662, where service 664 is in retriable latency tolerance 674 and service 666 is in retriable latency tolerance 676, and both service 664 and service 666 are already executing in isolated guests 612 and 614. Scheduler 640 determines whether to elevate service 664 and/or service 666 to the real-time latency tolerance. In response to determining to elevate service 664 to the real-time latency tolerance, service 664 is elevated to the real-time latency tolerance. In an example, in response to determining not to elevate service 666 to the real-time latency tolerance, service 666 is terminated on isolated guest 612, freeing computing capacity. Service 662 is then executed on isolated guest 612.

In further examples of system 600, the retriable latency tolerance may be further divided into a time-bounded retriable latency tolerance and a deferrable retriable latency tolerance. In an example, another service in the time-bounded retriable latency tolerance is added to scheduling queue 642, including an associated timestamp. Scheduler 640 places a low priority request to add an additional isolated guest to isolated guests 612 and 614 to execute the new service. In an example, the low priority request is fulfilled by the provisioning of isolated guest 616 and the new service executes on isolated guest 616. In an example, after the timestamp associated with the new service expires, and the new service is elevated to the real-time latency tolerance. In an example, upon elevation of the new service to the real-time latency tolerance, the low priority request to add an additional isolated guest to isolated guests 612 and 614 may be elevated to a high priority request. The resulting high priority request may then, in an example, result in the allocation and provisioning of isolated guest 616. In an example, the new service may then execute on the newly allocated and provisioned isolated guest 616.

In an example, deferrable retriable latency tolerance services may be one-off time-insensitive services (e.g., defragmenting a hard drive at the next available opportunity) or recurring tasks that have a long time window to complete (e.g., weekly backups, daily garbage collection, batch data uploads, etc.). In the example, a deferrable retriable service may elevate to time-bounded retriable under certain circumstances. For example, exceeding a certain number of terminations may indicate that the deferrable retriable service is too easy to be supplanted and may not fully execute without an elevation of latency tolerance. In many examples, after a certain percentage completion of a deferrable retriable service, especially one that takes a long time to execute, termination may be very inefficient and therefore elevation of latency tolerance would be preferable. In an example, a time-bounded retriable latency tolerance service may have an execution window at least twice as long as it's estimated execution time (e.g., a service that takes four hours to execute but a deadline for execution is at least eight hours away, possibly even twelve or sixteen hours away). Meanwhile, a real-time latency tolerance service may require execution as soon as possible.

In an alternative example, service 664 may be in the time-bounded retriable latency tolerance. When the new service is elevated from time-bounded retriable to real-time, service 664 may be terminated freeing up capacity to execute the new service. Scheduler 640 may then add service 664 back to the scheduling queue 642. In some examples, service 664 may be added to scheduling queue 642 in the time-bounded retriable latency tolerance. In other examples, service 664 may be elevated to the real-time latency tolerance, in part as a result of being terminated. In either case, service 664 may execute on the newly provisioned isolated guest 616 once provisioning is complete. In an example, service 664 and the new service may have the same latency tolerance, with the new service sitting ahead of service 664 in the scheduling queue 642, thereby causing scheduler 140 to determine to have service 664 wait for isolated guest 616 to provision rather than the new service.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of allocating resources for cloud computing comprising:
   one or more processors;
   a memory;
   a plurality of isolated guests executing on the one or more processors communicatively coupled with the memory, wherein a quantity of isolated guests of the plurality of isolated guests flexibly scales based on computing resource demands;
   a plurality of services, each service of the plurality of services configured to execute on one or more isolated guests of the plurality of isolated guests, including a first service, a second service, and a third service, wherein each service of the plurality of services is in one of a real-time latency tolerance and a retriable latency tolerance, the retriable latency tolerance includes a time-bounded mode and a deferrable mode, services in the deferrable retriable latency tolerance are limited to executing on isolated quests pre-existing in the plurality of isolated quests, services in the real-time latency tolerance are prioritized over services in the retriable latency tolerance, and services in the time-bounded retriable latency tolerance are prioritized over services in the deferrable retriable latency tolerance;
   a scheduling queue; and
   a scheduler executing on the one or more processors to:
   add a first service in the real-time latency tolerance to the scheduling queue;
   determine that a current computing capacity of the plurality of isolated guests is below a minimum capacity threshold to execute the first service, wherein at least the second service and the third service are in the retriable latency tolerance and executing in the plurality of isolated guests;
   determine whether to elevate at least one of the second service and the third service to the real-time latency tolerance;
   responsive to determining to elevate the second service to the real-time latency tolerance, elevate the second service to the real-time latency tolerance;
   responsive to determining not to elevate the third service to the real-time latency tolerance, terminate the third service on a first isolated guest of the plurality of isolated guests, freeing computing capacity;
   execute the first service in the plurality of isolated guests including on the first isolated guest; and
   add a fourth service to the scheduling queue, wherein a position of the fourth service in the scheduling queue is based on a latency tolerance of the fourth service, and a timestamp associated with the fourth service.

2. The system of claim 1, wherein a determination whether to elevate the second service to the real-time latency tolerance is based on at least one of: (i) an expected completion time of the second service, (ii) a completion percentage of the second service, (iii) a time to completion of the second service, and (iv) a quantity of previous terminations of the second service.

3. The system of claim 1, wherein a fifth service in the time-bounded retriable latency tolerance and a timestamp associated with the fifth service is added to the scheduling queue, a low priority request to increase the quantity of isolated guests in the plurality of isolated guests associated with the fifth service is placed, and upon expiration of the timestamp, the fifth service is elevated to the real-time latency tolerance.

4. The system of claim 3, wherein upon elevation of the fifth service to the real-time latency tolerance, the low priority request to increase the quantity of isolated guests in the plurality of isolated guests associated with the fifth service is elevated to a high priority request to increase the quantity of isolated guests in the plurality of isolated guests.

5. The system of claim 4, wherein the fifth service executes on a second isolated guest added to the plurality of isolated guests in response to the high priority request to increase the quantity of isolated guests in the plurality of isolated guests being fulfilled.

6. The system of claim 4, wherein upon elevation of the fifth service to the real-time latency tolerance, a sixth service in the time-bounded retriable latency tolerance is terminated, freeing up computing capacity to execute the fifth service in the plurality of isolated guests and the sixth service is added to the scheduling queue with the real-time latency threshold responsive to being terminated to free up computing capacity to execute the fifth service.

7. The system of claim 6, wherein the sixth service executes on a second isolated guest added to the plurality of isolated guests in response to the high priority request to increase the quantity of isolated guests in the plurality of isolated guests associated with the fifth service being fulfilled.

8. The system of claim 3, wherein the fifth service executes on a second isolated guest added to the plurality of isolated guests in response to the low priority request to increase the quantity of isolated guests in the plurality of isolated guests being fulfilled.

9. The system of claim 1, wherein a timestamp associated with a fifth service in the deferrable retriable latency tolerance is added to the scheduling queue, and upon expiration of the timestamp, the fifth service is elevated to the time-bounded retriable latency tolerance, and a low priority request to increase the quantity of isolated guests in the plurality of isolated guests associated with the fifth service is placed.

10. The system of claim 1, wherein responsive to determining that the current computing capacity of the plurality of isolated guests is below the minimum capacity threshold to execute the first service, a high priority request to increase the quantity of isolated guests in the plurality of isolated guests associated with the first service is placed.

11. The system of claim 10, wherein at least one of the first service and the third service executes on a second isolated guest added to the plurality of isolated guests in response to the high priority request to increase the quantity of isolated guests in the plurality of isolated guests associated with the first service being fulfilled.

12. The system of claim 1, wherein the quantity of isolated guests in the plurality of isolated guests flexibly scales by activating at least one of (i) existing isolated guests in hibernation, (ii) new isolated guests provisioned with a delay, and (iii) new isolated guests provisioned immediately.

13. The system of claim 12, wherein a low priority request to increase the quantity of isolated guests may be fulfilled first by activing existing isolated guests in hibernation, and then by activating new isolated guests provisioned with a delay, while a high priority request to increase the quantity of isolated guests may be fulfilled by activating isolated guests of any type.

14. The system of claim 1, wherein each service of the plurality of services includes a respective set of performance criteria requirements associated with the respective service, further comprising:
    adding a fifth service in the real-time latency tolerance to the scheduling queue;
    determining that the current computing capacity of the plurality of isolated guests is below a minimum capacity threshold to execute the fifth service;
    determining that a second isolated guest executing a sixth service in the retriable latency tolerance fails to meet a set of performance criteria requirements associated with the fifth service; and
    waiting for an isolated guest that meets the set of performance criteria requirements associated with the fifth service to become available from one of (i) a completion of execution of a service, (ii) a termination of a service, and (iii) a fulfillment of a high priority request to increase the quantity of isolated guests in the plurality of isolated guests.

15. The system of claim 14, wherein each set of performance criteria requirements is based on an availability of at least one of network latency, processor cores, processor speed, memory size, GPU cores, and memory performance.

16. A method of allocating resources for cloud computing comprising:
    adding a first service in a real-time latency tolerance to a scheduling queue, wherein the first service is included in a plurality of services, each service of the plurality of services configured to execute on one or more isolated guests of a plurality of isolated guests, and each service of the plurality of services is in one of the real-time latency tolerance and a retriable latency tolerance;
    determining that a current computing capacity of the plurality of isolated guests is below a minimum capacity threshold to execute the first service, wherein a quantity of isolated guests of the plurality of isolated guests flexibly scales based on computing resource demands, and at least a second service and a third service are in the retriable latency tolerance and executing in the plurality of isolated guests;
    determining whether to elevate at least one of the second service and the third service to the real-time latency tolerance;
    responsive to determining to elevate the second service to the real-time latency tolerance, elevating the second service to the real-time latency tolerance;
    responsive to determining not to elevate the third service to the real-time latency tolerance, terminating the third service on a first isolated guest of the plurality of isolated guests, freeing computing capacity;
    executing the first service in the plurality of isolated guests including on the first isolated guest; and
    adding a fourth service in the real-time latency tolerance to the scheduling queue;
    determining that the current computing capacity of the plurality of isolated quests is below a minimum capacity threshold to execute the fourth service;

determining that a second isolated quest executing a fifth service in the retriable latency tolerance fails to meet a set of performance criteria requirements associated with the fourth service; and waiting for an isolated quest that meets the set of performance criteria requirements associated with the fourth service to become available from one of (i) a completion of execution of a service, (ii) a termination of a service, and (iii) a fulfillment of a high priority request to increase the quantity of isolated quests in the plurality of isolated quests.

17. A computer-readable non-transitory storage medium storing executable instructions, which when executed by a computer system, cause the computer system to:

add a first service in a real-time latency tolerance to a scheduling queue, wherein the first service is included in a plurality of services, each service of the plurality of services configured to execute on one or more isolated guests of a plurality of isolated guests, each service of the plurality of services is in one of the real-time latency tolerance and a retriable latency tolerance, the retriable latency tolerance includes a time-bounded mode and a deferrable mode, services in the deferrable retriable latency tolerance are limited to executing on isolated quests pre-existing in the plurality of isolated quests, services in the real-time latency tolerance are prioritized over services in the retriable latency tolerance, and services in the time-bounded retriable latency tolerance are prioritized over services in the deferrable retriable latency tolerance;

determine that a current computing capacity of the plurality of isolated guests is below a minimum capacity threshold to execute the first service, wherein a quantity of isolated guests of the plurality of isolated guests flexibly scales based on computing resource demands, and at least a second service and a third service are in the retriable latency tolerance and executing in the plurality of isolated guests;

determine whether to elevate at least one of the second service and the third service to the real-time latency tolerance;

responsive to determining to elevate the second service to the real-time latency tolerance, elevate the second service to the real-time latency tolerance;

responsive to determining not to elevate the third service to the real-time latency tolerance, terminate the third service on a first isolated guest of the plurality of isolated guests, freeing computing capacity;

execute the first service in the plurality of isolated guests including on the first isolated guest; and add a timestamp associated with a fifth service in the deferrable retriable latency tolerance to the scheduling queue, wherein upon expiration of the timestamp, the fifth service is elevated to the time-bounded retriable latency tolerance, and a low priority request to increase the quantity of isolated quests in the plurality of isolated quests associated with the fifth service is placed.

18. A method of allocating resources for cloud computing comprising:

adding a first service in a real-time latency tolerance to a scheduling queue, wherein the first service is included in a plurality of services, each service of the plurality of services configured to execute on one or more isolated guests of a plurality of isolated guests, each service of the plurality of services is in one of the real-time latency tolerance and a retriable latency tolerance, the retriable latency tolerance includes a time-bounded mode and a deferrable mode, services in the deferrable retriable latency tolerance are limited to executing on isolated guests pre-existing in the plurality of isolated guests, services in the real-time latency tolerance are prioritized over services in the retriable latency tolerance, and services in the time-bounded retriable latency tolerance are prioritized over services in the deferrable retriable latency tolerance;

determining that a current computing capacity of the plurality of isolated guests is below a minimum capacity threshold to execute the first service, wherein a quantity of isolated guests of the plurality of isolated guests flexibly scales based on computing resource demands, and at least a second service and a third service are in the retriable latency tolerance and executing in the plurality of isolated guests;

determining whether to elevate at least one of the second service and the third service to the real-time latency tolerance;

responsive to determining to elevate the second service to the real-time latency tolerance, elevating the second service to the real-time latency tolerance;

responsive to determining not to elevate the third service to the real-time latency tolerance, terminating the third service on a first isolated guest of the plurality of isolated guests, freeing computing capacity;

executing the first service in the plurality of isolated guests including on the first isolated guest; and adding a fourth service in the time-bounded retriable latency tolerance and a timestamp associated with the fourth service to the scheduling queue, wherein a low priority request to increase the quantity of isolated guests in the plurality of isolated guests associated with the fourth service is placed, and upon expiration of the timestamp, the fourth service is elevated to the real-time latency tolerance.

* * * * *

UNITED STATES PATENT AND TRADEMARK OFFICE
CERTIFICATE OF CORRECTION

PATENT NO. : 10,270,711 B2
APPLICATION NO. : 15/460411
DATED : April 23, 2019
INVENTOR(S) : Chen et al.

Page 1 of 1

It is certified that error appears in the above-identified patent and that said Letters Patent is hereby corrected as shown below:

In the Claims

In Column 16, Line 32 (Claim 1), replace "quests" with --guests--;

In Column 16, Line 33 (Claim 1), replace "quests" with --guests--;

In Column 18, Line 66 (Claim 16), replace "quests" with --guests--;

In Column 19, Line 1 (Claim 16), replace "quest" with --guest--;

In Column 19, Line 5 (Claim 16), replace "quest" with --guest--;

In Column 19, Line 10 (Claim 16), replace "quests" with --guests--;

In Column 19, Line 11 (Claim 16), replace "quests" with --guests--;

In Column 19, Line 25 (Claim 17), replace "quests" with --guests--;

In Column 19, Line 26 (Claim 17), replace "quests" with --guests--;

In Column 20, Line 4 (Claim 17), replace "quests" with --guests--;

In Column 20, Line 5 (Claim 17), replace "quests" with --guests--.

Signed and Sealed this
Twenty-third Day of July, 2019

Andrei Iancu
*Director of the United States Patent and Trademark Office*